United States Patent [19]

Magnuson et al.

[11] Patent Number: 4,670,214

[45] Date of Patent: Jun. 2, 1987

[54] METHOD FOR MAKING ELECTRODE MATERIAL FROM HIGH HARDNESS ACTIVE MATERIALS

[75] Inventors: Douglas Magnuson, Troy; Merle Wolff, Rochester; Sam Lev, Oak Park; Kenneth Jeffries, Pontiac, all of Mich.; Scott D. Mapes, Plano, Tex.

[73] Assignee: Energy Conversion Devices, Inc., Troy, Mich.

[21] Appl. No.: 861,889

[22] Filed: May 12, 1986

[51] Int. Cl.[4] ............................................. B22F 5/00
[52] U.S. Cl. ......................................... 419/3; 419/23; 419/28; 419/43; 419/69; 264/60; 264/65; 264/125; 264/171
[58] Field of Search ................... 419/3, 23, 28, 43, 69; 264/60, 65, 125, 171

[56] References Cited

U.S. PATENT DOCUMENTS

| | | | |
|---|---|---|---|
| 2,582,744 | 1/1952 | Brennan | 419/3 |
| 2,708,770 | 5/1955 | Herres et al. | 419/3 |
| 3,573,991 | 4/1971 | Lenfant et al. | 419/3 |
| 4,534,935 | 8/1985 | Ambrose et al. | 419/3 |

Primary Examiner—Stephen J. Lechert, Jr.
Attorney, Agent, or Firm—James D. Ryndak; Richard M. Goldman

[57] ABSTRACT

A method and apparatus for making electrode material from high hardness active electrode alloy powder are disclosed. In one embodiment, the method involves feeding the powder onto a carrier web, aligning a mesh or screen substrate with the carrier web, and compacting the powder and mesh in a series of roller mills. The carrier is removed after it has passed through the first roller mill, and the remaining green electrode web is passed through the second roller mill and into a sintering furnace. After sintering and cooling, the web is calendered, and then is wound on a take-up reel. The furnace provides a substantially water and oxygen-free argon-hydrogen atmosphere for sintering which discourages web oxidization at the elevated sintering temperature. A loss-in-weight feeder can be used to accurately deposit the desired amount of active material on the carrier web.

28 Claims, 2 Drawing Figures

METHOD FOR MAKING ELECTRODE MATERIAL FROM HIGH HARDNESS ACTIVE MATERIALS

FIELD OF THE INVENTION

This invention relates generally to the production of sheets of electrode material for batteries, and more particularly, concerns a method and apparatus for continually producing an elongated negative electrode sheet or web.

BACKGROUND

Secondary batteries, also known as rechargeable batteries, are finding increasing commercial favor in a variety of applications. Some of these batteries comprise a negative electrode which is capable of reversibly electrochemically storing hydrogen. The negative electrode contains an active material which may be a metal alloy comprised of titanium, nickel and usually other materials. Other metallic alloys can also be used as the active material. Suitable alloys are disclosed in U.S. Pat. No. 4,551,400, for example.

The production of these negative electrodes is sometimes difficult because many hydrogen storage active materials are not very ductile, and they are of relatively great or high hardness. Indeed, these alloys can have a Rockwell "C" ($R_C$) hardness of 45 to 60 or more. Usually the alloy is formed from a melt, and the resulting alloy material must then be crushed or otherwise worked before the material is fabricated into an electrode. The alloys are usually utilized in powdered form in the manufacture of the electrode. This powder takes the form of small ash or flake-like particles which after suitable treatment will pass through a 200 U.S. mesh screen, and thus are smaller than 38 microns in size (200 U.S. mesh screen has interstices of about 75 microns).

Various methods of manufacturing electrode strip have been previously offered, but these methods and their associated equipment cannot be used with the high hardness, flake or ash-like active powdered material involved here. For example, a system for making battery plates is suggested in U.S. Pat. Nos. 3,894,886 and 3,951,688, but that system involves using an electrochemically active thixotropic paste.

Another method of making electrode strip involves feeding a free-flowing silver powder to a moving paper web. Vibrating doctor blades spread the powder on the carrier to a pre-determined thickness. A silver grid structure or mesh is introduced to the powder and carrier. A single rolling mill compresses the grid and powder on the carrier, and then the carrier is withdrawn. The remaining web is then sintered. After the sintered silver strip leaves the sintering furnace, it is cut into strips for use in silver-zinc battery cells.

This system cannot be used with the high hardness active powdered material involved here, because the present powder does not act in the same way as the silver powder and mesh in the silver electrode production line and production equipment. When the high hardness powder particles stick to or become embedded in the paper. Web tearing or other web damage can result. In addition, the present invention contemplates depositing a relatively thin layer of flake-like particles on a smooth, hard carrier. It has been found that doctor blades are ill-suited to provide a precisely controlled thickness or depth of powder, because the powder flakes or ash-like particles tend to commingle and build up in front of the blades. A powder layer of irregular thickness and density and occasionally inadequate depth results. Uniformity of powder depth and amount of active material per unit area is necessary to provide a uniform electrode strip. A uniform strip thickness is essential for battery electrodes if finished battery design capacity and performance are to be achieved.

Accordingly, a need exists for a production method and production apparatus capable of making electrode strip from very hard flake-like powder feed stock material. More specifically, a need exists for a method and apparatus to form negative electrode strip material from powdered alloy materials having a Rockwell "C" hardness ($R_C$) of 45 to 60 or more. As used here, the term "high hardness" will be understood to refer to a Rockwell "C" hardness of 45 to 60 or more.

SUMMARY OF THE INVENTION

This invention provides a method and apparatus for making electrode material from high hardness active electrode alloy powder that may be flake-like or ash-like and irregularly shaped.

Generally, the method includes the steps of feeding the high-hardness powder onto a hard, strong carrier web, which can be polyester, from a suitable feeder, which can be a loss-in-weight feeder. A mesh or screen electrode substrate is aligned with the carrier web, and the powder and mesh is compacted by a suitable device, which can be a series of at least two rolling mills. The carrier web is removed, and the remaining self-supporting electrode web can be passed into a sintering furnace. The sintering furnace provides a substantially water and oxygen-free argon-hydrogen atmosphere for sintering which discourages web oxidization at the elevated sintering temperature. After sintering and cooling, the web can be calendered and then is wound on a take-up reel.

In accordance with one aspect of the present invention, the method of making an electrode from high hardness active powdered material includes the steps of feeding a measured amount of a high hardness active powdered material onto a carrier web, aligning a substrate with the carrier web, feeding the carrier web, substrate and powdered material to at least two roller mills in series and compacting the powdered material and substrate through at least two roller mill compactions to achieve an electrode web of at least sufficient strength to allow sintering and removing the carrier web from the electrode web.

In accordance with another aspect of the present invention, a method of making an electrode from high hardness powdered active material is provided that includes the steps of feeding powdered active material onto a carrier web with a loss-in-weight feeding device, aligning substrate with the carrier web and feeding the substrate, carrier web and powdered material to a compacting device, that may be a roller mill, thereafter compacting the powder and the substrate in the compacting device whereby a self-supporting electrode web comprising the active material and substrate is provided having at least sufficient strength to allow sintering and removing the carrier web from the electrode web.

In accordance with still another aspect of the present invention, an apparatus for making an electrode from high hardness powdered active material is provided. The apparatus includes a feeding device for feeding the powdered active material onto a carrier web, structure for providing a substrate to the carrier web and the powder carried thereon and a compacting device comprising two roller mills in series for successively compacting the powdered active material onto and into the substrate to form an electrode web capable of being self-supporting after compaction by the first roller mill. The feeding device is preferably a loss-in-weight feeder. Structure for removing the carrier web from the electrode web after compaction by the first roller mill to leave a self-supporting electrode web is provided. The apparatus can further include a sintering furnace for sintering the compacted powdered material and substrate.

In accordance with another aspect of the invention, the apparatus for making an electrode is provided that includes a loss-in-weight feeding device for feeding high hardness active electrode material onto a carrier web, structure for feeding a substrate onto the carrier web bearing the powder, a compacting device for compacting the powder and substrate on the carrier whereby an electrode web is formed having at least sufficient strength to be self-supporting and structure for removing the carrier web to leaved a self-supporting electrode web having at least sufficient strength to allow sintering.

In accordance with another aspect of the invention, the apparatus for making an electrode from high hardness powdered active material, such as a $R_C$ hardness of 45 or more, includes an elongated carrier web having a tensile strength of at least about 10,000 psi and Rockwell Method A hardness ($R_A$) of at least about 90, structure for feeding high hardness powdered active material onto the carrier web at a preselected rate, structure for providing an elongated substrate in alignment with the carrier web, structure for compacting the powdered active material on the carrier with the substrate to produce an electrode web composed of the active material and the substrate, the electrode web having at least sufficient strength to be self-supporting and to allow sintering. The apparatus further includes structure for advancing the carrier web from the feeding structure to the compacting device and also structure for advancing the substrate in alignment with the carrier web to the compacting device. Structure for separating the carrier web from the electrode web is also provided. The electrode web may then be sintered in a suitable sintering furnace.

DETAILED DESCRIPTION

Figures 1, 2:
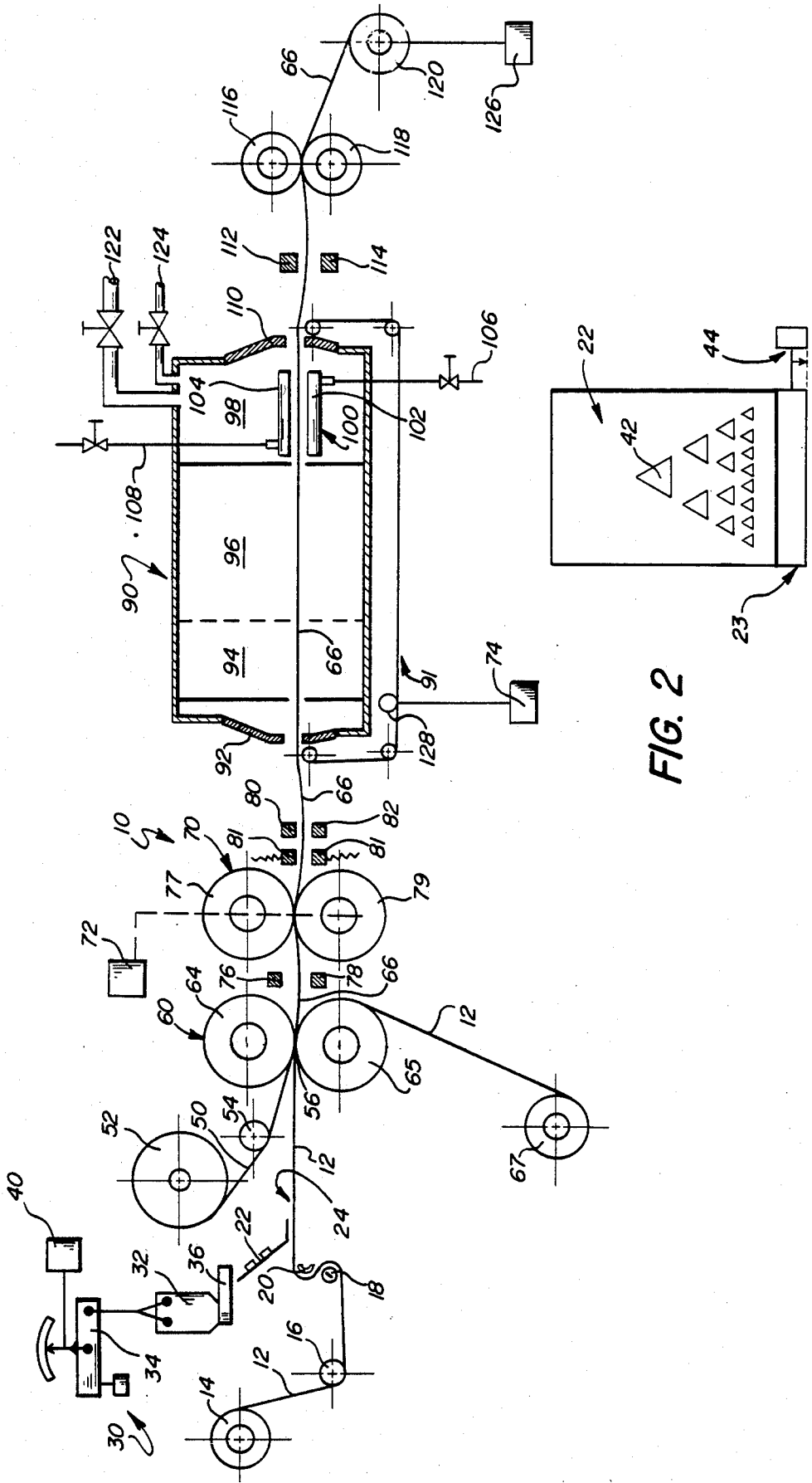
FIG. 1 is a schematic illustration of an arrangement of equipment for producing the electrode material in a continuous strip form.
FIG. 2 is a developed elevational view of part of the equipment shown in FIG. 1.

Turning first to FIG. 1, there is shown, in schematic form, a production line for producing a continuous negative electrode strip from a negative electrode powder material of the type described above.

To move the powdered material through at least the first portion of the production process, a removable carrier web is provided. Generally, the carrier web is not reusable and can be a suitable polymer film material such as polyester, nylon, acetate polymers including cellulose acetate and vinyl acetate and flexible metals such as aluminum, steel and alloys thereof. Carriers made of such polymers and metals have essentially no porosity in which particles could embed, unlike paper, for example. This is one of the reasons paper cannot be used. Preferably, the carrier web is a polyester plastic film material. One especially suitable film is Mylar ® polyester film, from E. I. DuPont de Nemours and Company of Wilmington, Del. Preferably, the film material is less than 20 mils thick, and most preferably it is 5 mils thick. The carrier web has a smooth surface and it has a hardness and porosity sufficient to resist particle embedding adherence during particle and carrier compression in a rolling mill.

Generally, a hardness of more than about $R_A$ (Rockwell Method A) 90 is sufficient and preferably the hardness is about $R_A$ 115 or more. The carrier web should also have a tensile strength sufficient to resist stretching during its use. Generally, a tensile strength of about 10,000 psi or more is sufficient and preferably film having a tensile strength of about 45,000 psi is used. Alternatively, this carrier web can take the form of a polyester film for contact with the active material and kraft paper laminate. It is contemplated that, in one embodiment, the carrier web will move through the manufacturing line at a constant speed of about 2.5 feet per minute.

In the production line illustrated in FIG. 1, a carrier web 12 is lead from a feed roll 14 past an idler roller 16 and through a tensioning roller 18. Carrier web 12 then passes over a curved final positioning shoe 20 so as to travel closely underneath an inclined delivery slide 22 and conveyor pan 23. A powder loading region 24 of web 12 is located downstream at conveyor pan 23.

The active negative electrode material, in its original dry feed stock powdered form, generally together with a suitable type and amount of binder material, such as up to about 7 weight % of powdered nickel, is dispensed from a loss-in-weight feeder device 30. The binder material can aid in the sintering process to achieve the desired mechanical integrity. The binder does not aid in the compaction process to achieve green strength as do organic thixotropic additives or adhesives. Water and slurry mixes are not used because unacceptable oxidation of the active material would occur. As schematically illustrated here, the dry powder can be stored in a suitable feeder bin 32 which is connected to a weighing device 34. To deliver powder from bin 32 to slide 22 at a uniform rate, a delivery device such as a screw conveyor 36 is provided. Material is deposited from slide 22 onto conveyor pan 23 which extends generally horizontally along web 12 and which can be vibrated suitably to facilitate depositing the active material onto web 12. For example, the vibration may be a cyclical oscillation consisting of a first cycle comprising movement in a vertical direction away from the web concurrent with movement in a horizontal direction in the direction of web transport and a second cycle comprising movement in the opposite directions, namely movement in a vertical direction towards the web concurrent with movement in a horizontal direction in the opposite direction of web transport.

Weighing device 34 is connected to a microprocessor or other numerical control device 40. Numerical control device 40 can be connected to screw conveyor 36 and to downstream web speed monitoring devices. Numerical control device 40 is programmed to automatically adjust the powder delivery of screw conveyor 36 so as to deposit the active powder material in loading region 24 at a weight rate calculated to provide material at a uniform weight per unit area. If the carrier movement speeds up, more powder is at once delivered; if the carrier slows down, less powder is provided. Thus, this loss-in-weight delivery mechanism deposits the powdered negative electrode active material on the carrier web at a highly uniform weight per unit area. In this way, a precisely controlled weight of powdered anode material is delivered to each measure of carrier area. No doctor blades or other imprecise adjustment devices are needed. In fact, doctor blade devices have been found to be unacceptable for the types of materials that this apparatus is capable of processing.

Delivery slide 22 is more fully illustrated in FIG. 2. Material deposited on slide 22 encounters material divider elements taking the form of small triangles 42 ordered in an extending and descending cascade array. To help provide uniform material flow stream to web 12 a vibrating mechanism 44 is provided for vibration in a manner as previously described of conveyor pan 23, which in this case also vibrates slide 22, slide 22 being rigidly connected to conveyor pan 23. It is contemplated that the layer thickness of powder deposited upon the carrier will generally be on the order of 60 to 70 mils, which may be only about fifteen to twenty particles, or less, for some types of active materials. Typically, for example, the amount of active powdered material per square centimeter deposited on the carrier may be about 0.17 grams.

Next, a mesh electrode substrate 50 is aligned with carrier web 12 and introduced to the powder on carrier web 12. Electrode substrate 50, in this case, is a continuous web of nickel mesh provided in the form of a roll 52. In this embodiment, the nickel mesh takes the form of a 20×20 mesh of 7 mil wire, but other forms of mesh could be used. For example, a 10×40 mesh of 5 mil wire has been found acceptable. Alternatively, nickel-plated steel wire mesh could be used, or the substrate could take the form of Exmet brand expanded metal or other suitable forms.

As shown in FIG. 1, substrate mesh material 50 passes a curved final positioning shoe 54 and meets the powder and carrier web 12 at the nip 56 of the first of a series of several roller mills 60, 70. In accordance with one aspect of the invention, the powder and substrate are compacted together by a series of compaction rollers into an electrode web having a minimum green strength with a compacted density of about 4–8 and preferably about 6 grams per cubic centimeter and about 15–30% porosity. It is believed that some porosity is needed to provide optimum contact between the finished battery electrode and the battery electrolyte. If desired, the mesh could be introduced prior to the nip of the first roller mill, but a final electrode web having different bending and/or electrochemical properties would be produced because the mesh may be at a different location relative to the active material. Thus, the mesh could be positioned at the center of the active material, for example.

In carrying out the invention, it is preferred to provide two roller mills 60 and 70. In the first roller mill 60, the rollers 64 and 65 address each other with a roll force of about 50 tons and compact the incoming mesh and powder with a pressure of, preferably, 1 to 7 tons per square centimeter. When so compressed, the powdered material and substrate adhere in a continuous electrode web 66 consisting of the active material, substrate and binder (if present) having a thickness of about 20 mils and at least sufficient green strength which will permit electrode web 66 alone to be self-supporting and withstand subsequent handling. After the material and carrier web 12 pass through first roller mill 60, carrier web 12 is stripped away from freely suspended green electrode web 66. Carrier web 12 can be wound upon a take-up roll 67 and subsequently discarded.

First roller mill 60 is driven so as to provide a small amount of slack, as illustrated in FIG. 1. Slack sensors 76, 78 can be imposed between roller mills 60 and 70 to sense the amount of slack provided, and to provide corresponding signals to the roller mill control processor 72. Roller mills 60 and 70 do not operate at precisely the same speed because the powder and mesh being compressed deforms and elongates as it moves between the rolls.

To provide the final compaction necessary so as to provide the desired porosity, which may be about 15–30%, for example, second roller mill 70 includes two rolls 77, 79 which address each other and interposed green electrode web 66 with a pressure of preferably about 7 to 14 tons per square centimeter or a roll force of about 50 tons. Electrode web 66, consisting of the substrate and active material with binder, is reduced to a thickness of about 15 mils by this second roller mill 70.

Although a single roller mill can provide the necessary compaction, it has been discovered that use of a single roller mill requires such high operating pressures as to make mill purchase and maintenance relatively expensive. In accordance with this aspect of the invention, then, the provision of two 75 ton capacity roller mills operated in series as disclosed here provide the requisite pressures and material transformations at a relatively modest cost. In addition, a second compaction with the carrier web having been removed, allows improved control and uniformity of the final electrode web properties including the web density.

It has been found helpful to configure at least the first rolling mill rolls with concave crowns of one to five mils. These rolls provide good material compaction near the center of the web, and inhibit web and carrier wander movement as they move through the rolling mills. The second mill rolls can also be concave crowned, generally to a lesser degree.

To adjust the web thickness, the mills are provided with turn down wheels operated by stepper motors. These motors adjust roller positions to provide the desired roller spacing or interengagement. This arrangement permits roll adjustment as precise as 0.1 mil, although adjustments are usually made in 1.0 mil increments.

The now fully compacted green web 66 passes out of second roller mill 70, and a slight amount of slack is provided. To this end, additional slack sensors 80, 82 are connected to transport conveyor drive controller 74 so as to adjust transport conveyor speed and web movement speed. A thickness gauge 81, preferably a noncontact thickness gauge, is provided after roller mill 70 to measure the electrode web thickness to provide information for controlling the position of the rollers (roller spacing).

Green electrode web 66 then passes into the sintering furnace 90 to develop mechanical integrity in the finished electrode web product.

To move green electrode web 66 through the furnace without excessive strain, transport conveyor 91 is driven by a motor drive 128. Sintering occurs in a substantially oxygen-free atmosphere. Preferably, the atmosphere consists of approximately 96% argon and approximately 4% hydrogen, by volume. To avoid oxidizing the web, the sintering atmosphere within furnace 90 is maintained substantially free of oxygen and water, usually at a level of less than 20 parts of oxygen per million parts of atmosphere, and preferably, the oxygen present in the sintering furnace is less than one part per million. Atmospheric moisture levels are preferably maintained at a dew point of −50° C. to −65° C. to inhibit web oxidation. The small amount of hydrogen is provided to prevent oxide formation on the active material and to encourage reduction of residual oxygen. Gas is provided by argon valve 122 and by hydrogen valve 124. Even gas distribution is provided by a suitably desired plenum.

To maintain the integrity of the oxygen-free atmosphere, a low profile gas gate slot mechanism 92 is provided at the upstream end of the continuous sintering furnace 90 and the sintering atmosphere is at positive pressure with respect to the external atmosphere.

After passing through gas gate 92, the electrode web enters a pre-heat zone 94 in which a temperature of 25° to 100° centigrade is provided. The low profile presented by the gas gate extends throughout the pre-heat zone. The profile is less than one inch. In the pre-heat zone, any absorbed water which may be present in green electrode web 66 is driven off. It has been found useful to make this pre-heat zone approximately 16 feet long for the web movement speeds contemplated here.

After moving through the pre-heat zone, green electrode web 66 enters a sintering zone 96 which is of a suitable length to provide the desired degree of sintering at the operating temperature and web speed contemplated. The sintering zone profile is much higher than the gas gates and is approximately 12 inches. A preferred temperature range is approximately 950° to 1050° centigrade. About 20-24 feet is a suitable length for the contemplated operating conditions. A plurality of sub-zones of varying temperatures can be utilized as desired.

The hot sintered electrode web 66 is then passed through a cooling zone 98 of suitable length, in this case about 18-20 feet. The entire cooling zone has the same low profile as the entrance pre-heat zone. A hydrogen-enriched atmosphere can be provided by a plenum or other device to discourage web oxidization. Alternatively, the atmosphere may be the same throughout the pre-heat, sintering and cooling zones. To encourage rapid yet controlled cooling, this cooling zone 98 is provided with a heat exchanger 100 having a lower water-cooled element 102 and an upper water-cooled element 104 located close to the hot web 66. Incoming cool water can be provided through suitable piping 106; relatively hot water is discharged through appropriate piping 108.

The cooled and sintered web then passes through an exit gas gate 110, which provides a corresponding signal to take-up roller control processor 126. Again, it is desired that slack be provided in the web 66, and to that end, slack controllers 112, 114 are located just downstream of the exit gas gate 110.

In the preferred form of the invention, the cooled and sintered web 66 is then calendared by passing it through calendaring rolls 116, 118 which generally are set to apply a pressure in the range from about 0.2 to 1.0 ton per square centimeter. The calendared web 66 is then wound on a take-up roll 120. Completed roll 120 of product can then be removed and transported to other sites for battery manufacture.

While the invention has been described in connection with preferred embodiments and procedures, it will be understood that it is not intended to limit the invention to the described embodiments or procedures. On the contrary, it is intended to cover all alternatives, modifications and equivalents as may be included within the spirit and scope of the invention as defined by the appended claims.

We claim:

1. A method of making an electrode from high hardness active powdered material, comprising the steps of
    (a) feeding a measured amount of a high hardness active powdered material onto a carrier web,
    (b) aligning an electrode substrate with the carrier web; thereafter
    (c) feeding a carrier web, electrode substrate and powered material to at least two roller mills in series;
    (d) compacting the powdered material and substrate through at least two roller mill compactions to produce an electrode web composed of said active material and said electrode substrate, of at least sufficient strength to allow sintering; and
    (e) removing said carrier web from said electrode web.

2. A method according to claim 1 wherein said carrier is less than 20 mils thick.

3. A method according to claim 1 wherein said carrier web has a tensile strength of at least about 10,000 psi and an $R_A$ hardness of at least about 90.

4. A method according to claim 1 wherein said feeding step includes the step of feeding powder onto a carrier from a loss-in-weight feeder.

5. A method according to claim 1 further including the step of removing said carrier from said material web after said web and said carrier have passed through at least one compaction.

6. A method according to claim 1 wherein the first compaction of said active material and substrate produces an electrode web that has sufficient strength to be self-supporting and the step of removing said carrier web from said electrode web occurs after said carrier web and active material and substrate have passed through said first roller mill compaction and before said second roller mill compaction.

7. A method according to claim 1 wherein said compacting step includes the step of compacting said powdered material by more than 50% by volume.

8. A method according to claim 1 wherein said carrier is fed into said rolling mills at a substantially constant rate of speed.

9. A method according to claim 1 wherein said powdered material fed to said carrier passes a screen of 200 U.S. mesh.

10. A method according to claim 1 wherein said compaction step includes the step of compacting said electrode web to a final compaction density of about 15 to 30% porosity.

11. A method according to claim 1 wherein said alignment step includes the step of aligning an electrode substrate screen with said carrier.

12. A method according to claim 1 further comprising the step of sintering said electrode web.

13. A method according to claim 12 wherein said sintering step includes the step of sintering said electrode web in an atmosphere comprising argon and hydrogen, and substantially free of oxygen and water.

14. A method according to claim 13 wherein oxygen comprises less than 20 parts per million of said atmosphere.

15. A method according to claim 1 wherein the hardness of said active material is greater than about $R_C 45$.

16. A method according to claim 1 wherein the hardness of said active material is from about $R_C 45$ to about $R_C 60$.

17. A method according to claim 12 further comprising the step of calendaring the sintered electrode web.

18. A method of making an electrode from high hardness powdered active material comprising the steps of:
  (a) feeding powdered active material onto a carrier web with a loss-in-weight feeding device;
  (b) aligning an electrode substrate with said carrier web and feeding said substrate, carrier web and powdered active material to a roller mill;
  (c) compacting the powder and said electrode substrate in said roller mill whereby a self-supporting electrode web comprising said active material and said substrate is provided having at least sufficient strength to allow sintering; and
  (d) removing said carrier web from the electrode web.

19. A method according to claim 18 wherein said carrier comprises material selected from the group consisting of polyester acetate polymers, nylon and flexible metals.

20. A method according to claim 18 wherein said carrier comprises polyester material having a hardness of at least about $R_A 90$.

21. A method according to claim 18 further comprising the step of sintering the electrode web.

22. A method according to claim 18 further including the step of calendaring the sintered electrode web.

23. A method according to claim 18 wherein said compacting step includes the step of compacting with two roller mills in series.

24. A method according to claim 23 including the step of adjusting the first of said roller mills so as to provide an initial compaction resulting in an electrode web that is capable of being self-supporting, and adjusting a second of said roller mills to again compact said powder and substrate so as to substantially achieve a desired final density.

25. A method according to claim 18 wherein said feeding step includes the step of feeding powder onto a carrier from a loss-in-weight feeder.

26. A method according to claim 18 wherein said feeding step includes the step of feeding powder onto a polyester carrier having a tensile strength of about 45,000 psi and a hardness of about $R_A 115$.

27. A method according to claim 24 comprising removing said carrier from said electrode web after said initial compaction and before compaction in said second roller mill.

28. In a method of making, by compaction with a roller mill, an electrode from high hardness active powdered material having an irregular flake-like particle shape wherein the desired thickness is about 20 times or less of the particle size to be compacted, the improvement comprising the step of feeding the material to a carrier by metering said material from a loss-in-weight feeder.

* * * * *